No. 827,316. PATENTED JULY 31, 1906.
W. E. MAGIE.
FRICTION CLUTCH.
APPLICATION FILED OCT. 28, 1904.
2 SHEETS—SHEET 1.
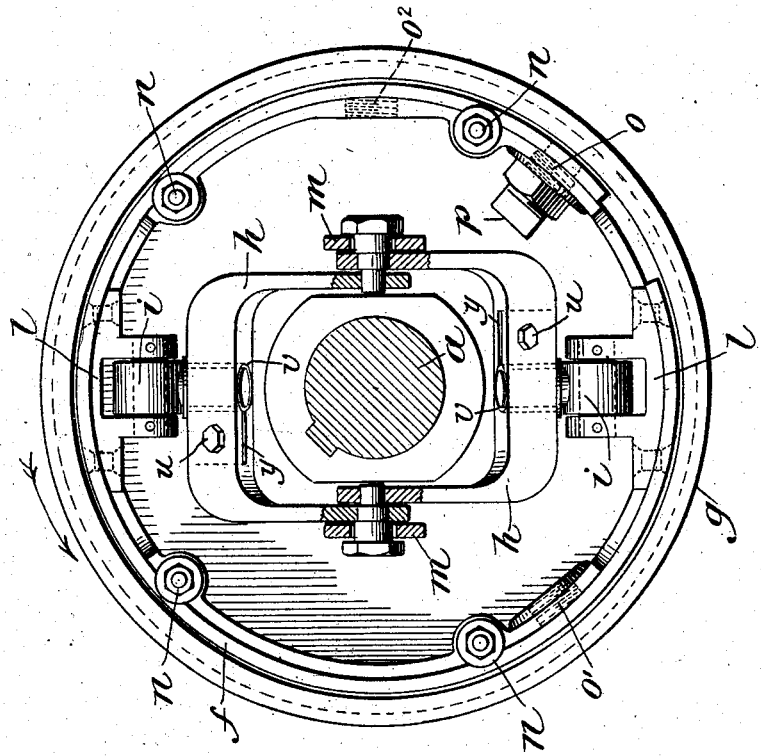
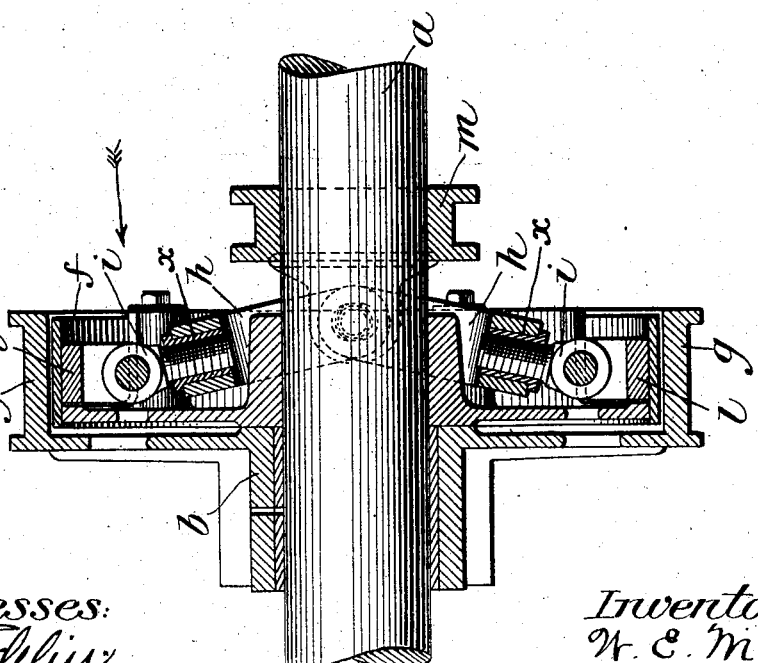
Witnesses:
O. W. Edelin.
Chas. J. O'Neill.
Inventor:
W. E. Magie
By his attys
Pennie & Goldsborough
THE NORRIS PETERS CO., WASHINGTON, D. C.

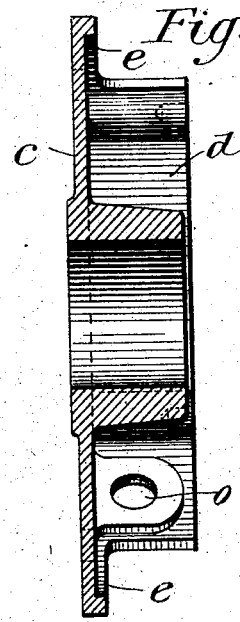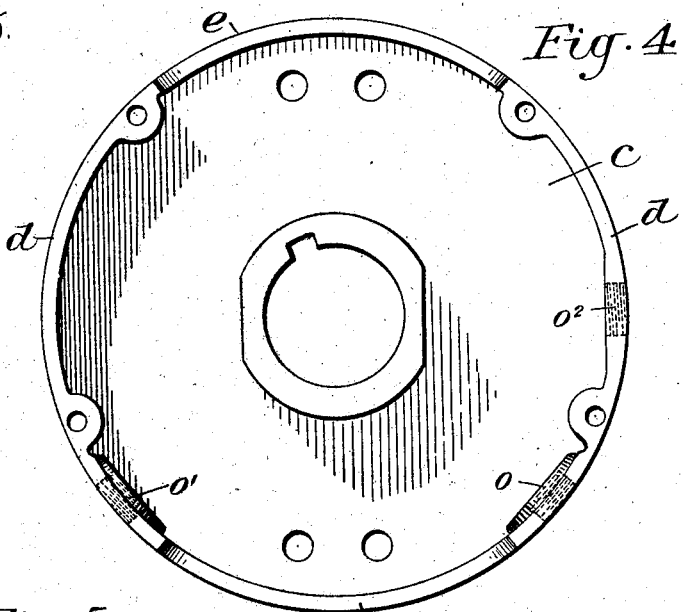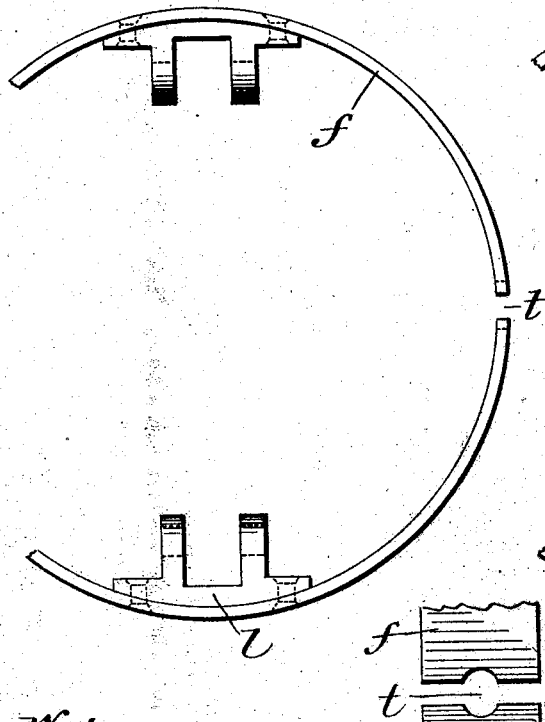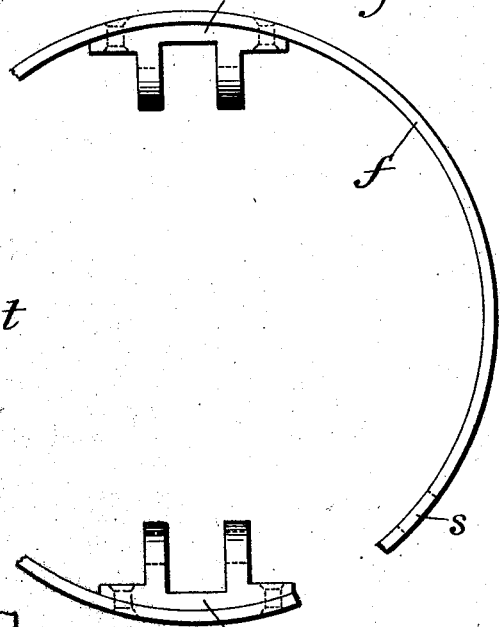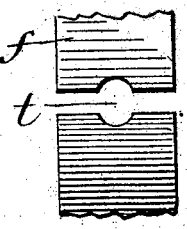

UNITED STATES PATENT OFFICE.

WILLIAM E. MAGIE, OF SOUTH MILWAUKEE, WISCONSIN, ASSIGNOR TO THE BUCYRUS COMPANY, OF SOUTH MILWAUKEE, WISCONSIN, A CORPORATION OF WISCONSIN.

FRICTION-CLUTCH.

No. 827,316.   Specification of Letters Patent.   Patented July 31, 1906.

Application filed October 28, 1904. Serial No. 230,324.

*To all whom it may concern:*

Be it known that I, WILLIAM E. MAGIE, a citizen of the United States, residing in the city of South Milwaukee, county of Milwaukee, State of Wisconsin, have invented certain new and useful Improvements in Friction-Clutches; and I do hereby declare the following to be a full, clear, and exact description of the invention, such as will enable others skilled in the art to which it appertains to make and use the same.

The invention relates to friction-clutches, and especially to those where the driving part consists of a band or ring which is pressed outward against the part to be driven by the toggle-like action of yokes that are pivotally connected to a collar sliding on the driving-shaft.

The particular object in view is to provide a clutch where the gripping action between the driving and driven parts will be the combined action of the ordinary shoe friction-clutch and of the ordinary accumulative internal-friction-band clutch.

This invention also provides for obtaining the tangential pressure to operate the internal friction-band from the friction derived by the shoe action of the clutch.

The invention also aims to produce a simple, durable, and efficient construction involving but few parts and arranged so that ease and certainty of operation can be relied on.

The invention is illustrated in the accompanying drawings, wherein—

Figure 1 is a sectional view in the axial line of the driving and driven parts. Fig. 2 is a face view looking into the clutch in the direction of the arrow in Fig. 1. Figs. 3 and 4 are sectional and side views of the disk-like driver that is secured to the shaft. Figs. 5 and 6 are elevations of different forms of the friction band or ring, and Fig. 7 is a detail showing a third form of the band.

Referring to the views, $a$ denotes the driving-shaft, and $b$ the part to be driven. Motion is transmitted from the shaft to the driven part by a driver $c$, that is fixedly secured to and revolves with the shaft. This driver is shown in detail in Figs. 3 and 4. It is in the form of a disk having a crown-flange $d$ extending around its periphery, the flange being cut away at the diametrically opposite points $e\ e$ to accommodate the operating connections of a friction band or ring $f$, that will presently be described in detail. The driven part has also the general form of a disk with a crown-flange $g$ extending all around its periphery and forming a housing into which fits the disk-like driving part with just sufficient annular space between the outer edge of the disk and the inner surface of the housing-flange to accommodate the friction-ring or band already referred to. The housing is loose on the shaft and is clutched thereto by the frictional contact of the ring or band $f$. This ring fits closely upon the flange $d$ of the driver $c$, as shown in Figs. 1 and 2. It is a discontinuous or split ring, as indicated in Figs. 2, 5, 6, and 7, and encircles the flange of the driver loosely, being secured thereto only at one point, and at that point it is fastened only in the sense of being prevented from moving around the shaft independently of the driver, as will be more fully described later on.

The ring $f$ is pressed outwardly against the inner surface of the housing-flange by means of yokes $h\ h$, that are connected to the ring by pins $i\ i$, pivotally attached to blocks $l\ l$, that are riveted to the ring at the diametrically opposite points where the flange of the driver is cut away. The yokes straddle the shaft, as indicated in Fig. 2, and extend radially thereof from a collar $m$, that slides on the shaft and rotates with it and the driving-disk. The collar is operated in a well-known way by a clutch-lever, (not shown,) and the yokes which are pivoted thereto operate with a toggle-like action to force the friction-band outwardly whenever the collar is slid toward the driving-disk.

The band $f$ encircles the driving-disk loosely and is held thereon by nuts and washers $n$, which are secured to the flange of the disk and overlap the edge of the band. At one point in the disk's circumference the band is secured thereto by a stop-bolt $p$, which is screwed into one of three threaded openings $o\ o'\ o^2$ in the disk flange from the inner side and has its end projecting into a hole in the band, so as to prevent the band from moving around on the disk, but not so as to prevent it from ready detachment therefrom.

As assembled herein the shaft and driving-disk revolve in the direction of the arrow in Fig. 2, and it is to be noted that the stop-bolt connects the band with the driving-disk only at that end of the band which is rearmost in respect to the disk's rotation. At all other points the band simply fits loosely around and upon the flange of the driver, and the object of securing it at the one point only is to secure the accumulative frictional action above referred to. When the clutch is assembled to rotate in the other direction, the friction-band is turned over, and the stop-bolt is screwed into the opening o', which, it will be noted, is on the opposite side of the center line of the shaft from the opening o.

As above described, the clutch is intended to drive only in one or the other direction, according as it is assembled, and is not reversible; but the invention also contemplates making the clutch reversible—i. e., to drive in either direction without changing the stop-bolt or band—and to this end the flange of the driver is provided with a third threaded hole $o^3$, the particular location of which with respect to the other openings is not important.

The band shown in Fig. 6 is provided with an opening to receive the end of the bolt, the opening being wholly within one end of the band. As thus constructed the band may have its position reversed from that indicated in Fig. 2, so that the opening will coincide with the threaded opening o' on the other side of the shaft and so that it may be secured by changing the stop-bolt over to that position.

The band shown in Fig. 7 has the opening t formed partly in each end, and when it is desired to make the clutch reversible this band is used and is positioned so that the stop-bolt will secure it when placed in the opening $o^2$. In this arrangement either end of the fricton-ring will be secured to the driver, depending upon the direction of the driver's rotation, one end or the other of the band simply bringing up against the end of the bolt when rotation of the clutch begins.

The operation of the clutch will be readily understood from the above description. When the band is pressed outward against the housing, the friction tends to crowd its free end back against the stop-bolt, and this results in an increase or accumulation of the friction between the rubbing-surfaces in a direction backward from the free end of the band, the ultimate effect being an exceedingly tight grip that is very effective in the driving operation and at the same time is quickly and easily released when the pressure is withdrawn.

In order to make the connection between the yokes and the band adjustable, the pins i i have their stems screw-threaded into sleeves x x, and these sleeves are clamped into openings v v, provided for them in the outer edges of the yokes, this part of each yoke being furnished with a slit y, leading into the opening, so that by means of a screw or bolt u the opening may be tightened up on the sleeve. In this way any desired adjustment may be made in the connection between the yokes and the friction-rings without taking out the pins, it being only necessary to loosen the screw and turn the sleeve up or down on the stem of the pin.

In further explanation of the accumulative frictional action above described it is to be noted that if the band were fastened to the driver at its front end the tendency would be simply to pull the band out straight, and its rear end being free there would be no piling up of the frictional grip; but when the arrangement is reversed, as herein contemplated, and the front end of the band is free and its rear end only is connected to the driver the band is pushed around, as it were, and the frictional grip increases or accumulates from the loose end to the fixed end, as already stated.

Having thus described my invention, what I claim is—

1. In a friction-clutch, the combination of a flanged disk-like driver secured to a rotating shaft, a driven housing loose on the shaft and having a flange encircling that of the driver, a split ring carried by the flange of the driver, a collar sliding on the shaft and having a toggle-like yoke pivoted thereto, a block secured to the ring, and a pin pivoted to the block and having a screw-threaded stem taking into an opening in the yoke.

2. In a friction-clutch, the combination of a flanged disk-like driver secured to a rotating shaft, a driven housing loose on the shaft and having a flange encircling that of the driver, a split ring carried by the flange of the driver, a collar sliding on the shaft and having a toggle-like yoke pivoted thereto, a block secured to the ring, a pin pivoted to the block and having a stem screw-threaded into a sleeve, and an adjustable opening in the yoke in which the sleeve is clamped.

3. In a friction-clutch, the combination of a flanged disk-like driver secured to a rotating shaft, a driven housing loose on the shaft and having a flange encircling that of the driver, a split ring carried by the flange of the driver, a connection between said split ring and said driver at one point only in the circumference of the driver, said connection being adapted to be changed from one side of the split in the ring to the other, and means for forcing the split ring into engagement with the driver-housing.

4. In a friction-clutch, the combination of a flanged disk-like driver secured to a rotating shaft, a driven housing loose on the shaft and having a flange encircling that of the driver, a split ring carried by the flange of the driver and secured thereto at one point only in the circumference of the driver, and means engaging the inner face of said ring for pressing the ring radially outward against the flange of the housing at a different point in the driver's circumference.

5. In a friction-clutch, the combination of a flanged disk-like driver secured to a rotating shaft, a driven housing loose on the shaft and having a flange encircling that of the driver, a split ring carried by the flange of the driver and adapted to be secured thereto at one point only in the circumference of the driver, means for connecting the ring to the driver at that end of the ring rearmost in the direction of rotation, and means engaging the inner face of said ring for pressing the latter against the housing.

6. In a friction-clutch, the combination of a flanged disk-like driver secured to a rotating shaft, a driven housing loose on the shaft and having a flange encircling that of the driver, a split ring carried by the flange of the driver and adapted to be secured thereto at one point only in the circumference of the driver, an adjustable stud for changing the point of connection between the ring and the driver, which stud may be made to occupy one of several positions on the flange of the driver and means for pressing the ring into engagement with the housing In testimony whereof I affix my signature in presence of two witnesses.

WILLIAM E. MAGIE.

Witnesses:
 HARRY B. HAYDEN,
 PAUL C. BODE.